United States Patent [19]

Culshaw et al.

[11] 4,408,354
[45] Oct. 4, 1983

[54] SIGNAL TRANSMISSION SYSTEMS

[75] Inventors: Brian Culshaw, Amersham; Peter R. Ball, Garston; Stuart A. Kingsley, London; David E. N. Davies, Hemel Hempstead, all of England

[73] Assignee: National Research Development Corporation, London, England

[21] Appl. No.: 223,724

[22] Filed: Jan. 9, 1981

[30] Foreign Application Priority Data

Jan. 14, 1980 [GB] United Kingdom ............... 8001212

[51] Int. Cl.³ ............................................. H04B 9/00
[52] U.S. Cl. ................................. 455/610; 455/611; 455/615; 455/617
[58] Field of Search ............... 455/610, 611, 612, 615, 455/617; 370/3, 4; 350/96.16; 358/200, 901; 332/1.51

[56] References Cited

U.S. PATENT DOCUMENTS 3,433,958  3/1969  Lenzo et al. ..................... 370/3
3,941,927  3/1976  Russell ............................ 358/200
4,085,319  4/1978  Deitz et al. ..................... 455/611
4,236,243  11/1980 Davies et al. ................... 455/611

OTHER PUBLICATIONS

Davies et al.–An Optical Fibre Data Collection Highway–Electro-Optics Laser International 1976 UK–Brighton, Sussex, England–Mar. 9-11, 1976, pp. 64-72.

Primary Examiner—Joseph A. Orsino, Jr.
Attorney, Agent, or Firm—Cushman, Darby & Cushman

[57] ABSTRACT

A signal transmission system impresses phase-modulated signals on to a multimode optical fibre waveguide 1. In order to overcome the effects of fading caused by small random changes in the parameters of the fibre the signals from different modes are all combined to derive a resulting signal which is detected in a common detector 23. The signals may be combined by a vibrating mirror 21 which sweeps the emergent beam across detector 23. Alternatively the tip of fibre 1 may be vibrated to achieve a similar effect.

12 Claims, 4 Drawing Figures

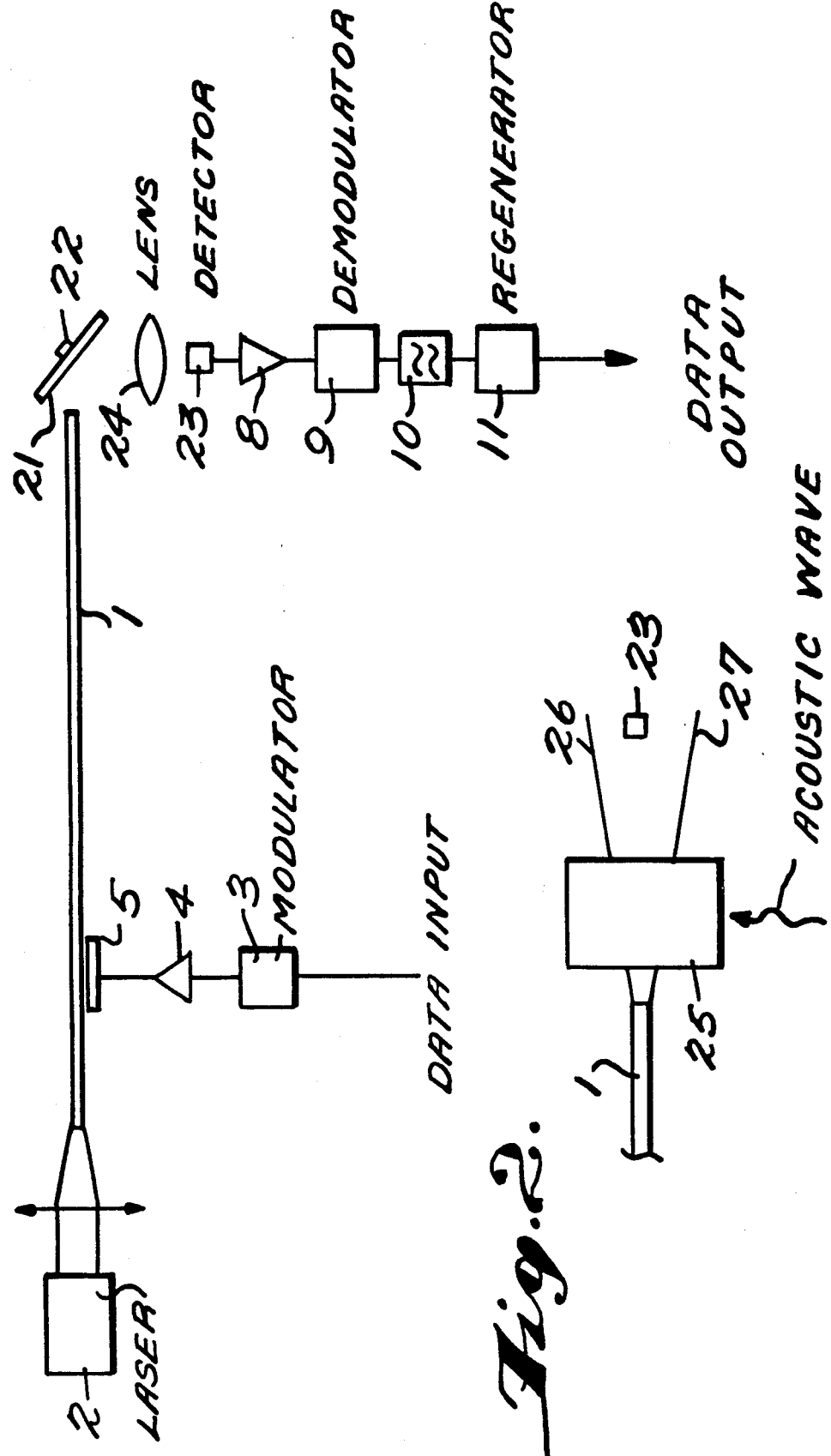

SIGNAL TRANSMISSION SYSTEMS

This invention relates to signal transmission systems using optical fibres. It has particular application in the detection of phase-modulated signals propagated in a multimode optical fibre.

Signals can be transmitted along optical fibres using coherent light from a source such as a laser and modulating the light beam by the signals that it is desired to transmit. A convenient method of modulation is to impress the signal to be transmitted directly on to the fibre by acoustic coupling means or other suitable means so as to phase-modulate the light beam. In a multimode optical fibre the phase-modulated signal is propagated along the fibre in a multiplicity of modes and the different signal modes interfere with each other to produce a resulting signal which has an amplitude modulated component related to the original impressed signal. In practice it is not possible to detect this amplitude modulated component directly as quite insignificant changes in the parameters of the fibre, caused for example by slight changes of length with temperature and small physical shifts, modify the interference pattern to cause fading of the signal in a random manner.

It is an object of the invention to provide an arrangement by which signal can be detected despite the presence of fading.

According to the invention a signal transmission system comprises means for propagating coherent light along a multimode optical fibre waveguide, means for impressing phase-modulated signals in said waveguide and means for detecting such phase-modulated signals comprising means for combining signals which have been propagated through the waveguide in different modes to derive a resulting signal, and means for detecting the resulting signal.

In one preferred embodiment of the invention the said combining means comprises scanning means for repetitively scanning across the beam emerging from the end of the waveguide so as to obtain a succession of signals from a plurality of positions spaced apart across the beam.

The scanning means may comprise a vibrating mirror. Alternatively the scanning means may comprise means for causing the tip of the waveguide to vibrate, for example by providing a piezo-electric crystal mechanically coupled to the waveguide and to which an a.c. signal is applied. The crystal may be in the form of a cantilever beam which is clamped at a position in the waveguide spaced from the tip thereof.

As an alternative to a vibrating mirror or a crystal-driven vibrator for the waveguide tip the scanning means may comprise an elastic medium through which the beam emerging from the waveguide is passed and which is subjected to an acoustic wave to repetitively vary the refractive index of the medium or alternatively to set up a direction pattern therein. In either case the emerging beam is repetitively swept through an angle.

In another preferred embodiment of the invention the combining means comprises means for inducing intermodal phase-modulation of the signal, for example by a mechanical vibrator coupled to the waveguide.

In order that the invention may be more fully understood reference will now be made to the accompanying drawings in which:

FIG. 1 illustrates an embodiment of the invention using a scanning mirror,

FIG. 2 illustrates an alternative arrangement using a photo-elastic medium,

Figure 3:
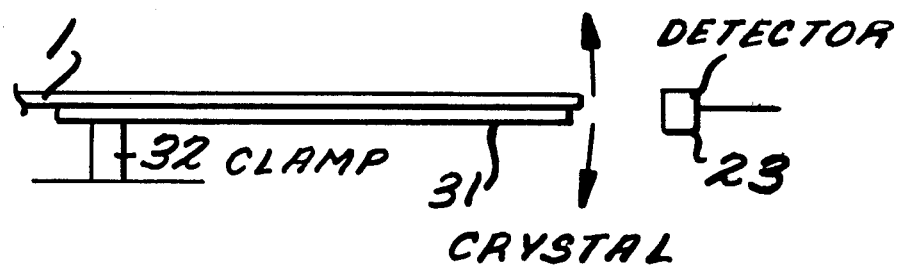
FIG. 3 illustrates an alternative arrangement in which the tip of the waveguide is vibrated.

Referring now to FIG. 1 there is shown therein an arrangement for transmitting signals using a multimode optical fibre 1. A laser 2 is coupled to one end of fibre 1 so as to transmit coherent light along the fibre. Information to be transmitted along the fibre is prepared in binary digital form and is fed to a frequency shift key modulator 3 which generates signals of one or other frequency depending on whether the data input to the modulator is a binary "1" or "0." Convenient frequencies for the two outputs of modulator 3 are say 9.0 MHz and 10.7 MHz. The frequency shift key output from modulator 3 is after amplification in an amplifier 4 applied, to a piezoelectric transducer 5 which is acoustically coupled to fibre 1. For the frequencies mentioned above transducer 5 can have a fundamental resonance frequency centred at 10.0 MHz with a bandwidth of 2 MHz. The above figures are given purely by way of example. Clearly different frequencies can be employed as considered convenient.

The effect of the signals applied to fibre 1 is to induce phase-modulation of the light beam at the two respective modulation frequencies. Since the signal is transmitted along the fibre in various modes there will be relative phase differences between these modes and different depths of phase-modulation in each.

It can be shown that the signal amplitude at the output end of the fibre is a function of the relative phase differences so that any changes in the relative phases caused by minor and insignificant changes in the parameters of the fibre, caused for example by minute changes of length with temperature and insignificant movement or vibration, will cause changes in the amplitude of the output signal which will be apparent as fading of the signal in an apparently random manner.

In order to overcome the effects of fading the light output from fibre 1 is directed on to a mirror 21 which rotates about an axis 22 perpendicular to the plane of the drawing. The effect of this is to sweep the beam from fibre 1 over an angle and this beam is directed on to a single photo-detector 23 after being focussed by a lens 24 positioned between mirror 21 and detector 23. The output from detector 23 is applied to an amplifier and demodulator chain from which the original impressed signal can be obtained. This chain comprises an amplifier 8, the output of which is fed to a frequency shift key demodulator 9. The output from demodulator 9 is passed through a low pass filter 10 to a digital bit regenerator 11 from which the output is obtained.

In operation of the arrangement of FIG. 1a, a mirror 21 causes the beam from fibre 1 to scan across detector 23 so that even if there is fading at any instant in some part of the beam there will be a detectable output elsewhere in the cross-section of the beam and thus at least some signal will be produced in detector 23 for each vibration of the mirror.

As an alternative to the arrangement of FIG. 1 an arrangement of FIG. 2 can be used in which like parts have like references to FIG. 1. In FIG. 2 in place of the vibrating mirror 21 a block 25 of a photo-elastic medium is provided interposed between the output of fibre 1 and the single detector 23. Medium 25 has applied to it an acoustic wave to cause compression waves to travel through the medium and locally vary the refractive index. The effect of this variation of refractive index is to cause the beam from fibre 1 to be refracted between the limits indicated by the dotted lines 26 and 27. The swept beam passes across the face of detector 23 in each half cycle of the frequency of the acoustic wave applied an block 25. Since there will be some output at any instant somewhere in the cross-section of the beam, the detector 23 will detect this output at least once during each sweep.

For acoustic waves of high frequency, instead of variation in the refractive index of block 25 it is possible to set up a diffraction pattern in the block which caused the beam to be deflected. The amount of deflection is dependent on the frequency of the applied wave so that by applying modulated acoustic waves the beam can be swept between two positions and while being so swept can be detected in a single detector 23.

Yet another arrangement is to pass the light output from the end of fibre 1 through a Fabry-Perot interferometer and focus the output from the interferometer on to a single detector similar to detector 23. The separation between the two half-silvered mirrors of the Fabry-Perot interferometer is set up to allow a small number of angles of propagation, conveniently two such angles. Thus two concentric cones of light pass through the interferometer and are focussed on to the detector. The separation between the mirrors is varied cyclically, for example by coupling one of the mirrors to an acoustic vibrator. Suitable ultrasonic frequencies of vibration of 100 kHz or more can be obtained by this method. The amplitude of the scanning movement is arranged to be equal to one wavelength of light and the resulting sweep of the cones of light through the angular difference between them enables all of the mutual interference signals in the light passing through the interferometer to be detected in detector 23.

In the embodiments described with reference to FIG. 1 and FIG. 2 the end of optical fibre waveguide 1 is fixed and the beam therefrom is swept, either mechanically as in FIG. 1 or by an acoustic wave as in FIG. 2. In the arrangement of FIG. 3, in which like parts have like reference numerals to FIG. 1, it is the tip of the fibre waveguide 1 that is mechanically vibrated. Referring now to FIG. 3 a signal is impressed on to fibre 1 in like manner to FIG. 1 and at the end of fibre 1 a crystal 31 is secured to the fibre so that any movement of crystal 31 causes the tip of fibre 1 to move in like manner. Crystal 31 is clamped at its end remote from the tip of the fibre by a clamp 32 and an alternating electrical signal is impressed on to the crystal so that crystal 31 resonates as a cantilever beam. Crystal 31 can conveniently be a multimorph, that is to say it may comprise a multilayer crystalline structure with electrodes between each layer. The signal is applied to the layers in parallel so that the voltage requirement is reduced. By choice of a suitable frequency for the alternating signal applied to the crystal and by selection of the position of clamp 32 crystal 31 will mechanically resonate causing the tip of fibre 1 to oscillate by a small amount, conveniently a fraction of a millimeter. A suitable frequency will be a few hundred hertz. The output beam from fibre 1 is directed on to a fixed detector 23 as in the arrangement of FIG. 1 and since there will be an output signal in some part of the beam detector 23 will always detect some signal as the beam is swept across its face.

In all the above embodiments the scanning or sweep frequency should be higher than twice the digital bit transmission rate to ensure that no information is lost in any scan.

Figure 4:
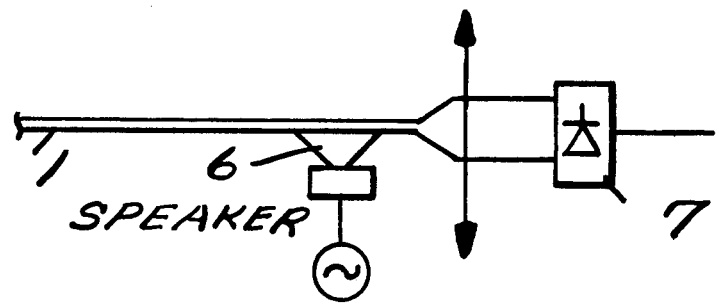
FIG. 4 illustrates an alternative embodiment of the invention using intermodal phase-modulation.

FIG. 4 illustrates another embodiment of the invention in which instead of producing a scanning motion of the output beam it is arranged that the different modes of transmission of the signal from fibre 1 are intermodulated relative to each other. Provided that a peak relative phase deviation of at least 90° between an appropriate pair of modes is produced this will ensure that the output signal reaches a maximum at least once during each data bit period. A simple way of inducing such large relative phase deviation is to couple a loudspeaker cone 6 to fibre 1 near the output end thereof and feed the cone with an alternating signal of sufficient frequency. After passing the vibrated cone 6 the output beam from optical fibre 1 is directed to a single photodetector 7. Loudspeaker cone 6 is one convenient example of applying a mechanically vibrating signal fibre 1. Clearly other arrangements for vibrating the fibre can be provided as alternatives.

In all of the above embodiments optic fibre waveguide 1 can carry a number of different digital signals each impressed by a separate piezo-electric transducer similar to transducer 5 and the output from detector 23 or 7 can be applied through appropriate band pass filters to separate the signals.

We claim:

1. A signal transmission system comprising:
   means for propagating coherent light along a multi-mode optical fibre waveguide;
   modulation means for impressing phase-modulation signals in said waveguide and allowing the impressed signals in different modes to interfere in the waveguide so that an amplitude modulated signal is generated which is subject to random fading across the waveguide;
   means provided at the output of the waveguide for inducing intermodal phase-modulation of the amplitude modulated signals from different parts of the cross-section of the waveguide to derive a single optical modulated signal in which the random fading is neutralized; and
   detector means comprising a single photodetector to which the said single optical modulated signal is applied.

2. The system as claimed in claim 1 in which the said inducing means comprise a mechanical vibrator coupled to the waveguide.

3. A signal transmission system comprising:
   means for propagating coherent light along a multi-mode optical fibre waveguide;
   modulation means for impressing phase-modulation signals in different modes in said waveguide, said impressed signals in different modes interfering in the waveguide to produce an amplitude modulated optical signal, said amplitude modulated optical signal tending to be subject to random fading at respective cross-sectional portions of the waveguide;
   a single photodetector disposed in optical receiving relationship with end of the waveguide; and
   means for effecting a relative motion between component portions of said amplitude modulated signal from respective cross-sectional portions of the waveguide and said detector to combine said component portions into a single amplitude modulated optical signal not subject to fading and applying said single amplitude modulated optical signal to said single photodetector.

4. The system as claimed in claim 3 in which said means for effecting a relative motion comprises scanning means for repetitively scanning across the beam emerging from the end of the waveguide so as to obtain a succession of signals from a plurality of positions spaced apart across the beam.

5. The system as claimed in claim 4 in which the scanning means comprises a vibrating mirror.

6. The system as claimed in claim 4 in which the scanning means comprises an elastic medium through which the beam emerging from the waveguide is passed and means for subjecting the said medium to an acoustic wave.

7. The system as claimed in claim 6 in which said acoustic wave repetitively varies the refractive index of the said medium.

8. The system as claimed in claim 6 in which the acoustic wave sets up a diffraction pattern in the said medium to cause the beam to be repetitively deflected between two positions.

9. The system as claimed in claim 4 in which the scanning means comprises means for causing the tip of the waveguide to vibrate.

10. The system as claimed in claim 9 in which the said scanning means comprises a piezo-electric crystal secured to the end of the waveguide and means for applying an oscillatory electrical signal to the crystal.

11. The system as claimed in claim 10 in which the crystal is in the form of a cantilever beam clamped at a position in the waveguide spaced from the tip thereof.

12. The system of claim 4, 5, 6, 7, 8, 9, 10, 11, 2 or 1 in which the said modulation means functions to modulate at two different frequencies in succession so that the resulting signal represents binary digital information.

* * * * *